Nov. 22, 1960 F. M. YOUNG ET AL 2,961,611

FREQUENCY DISCRIMINATOR

Filed Jan. 17, 1957 2 Sheets-Sheet 1

INVENTORS
FRINK MANSFIELD YOUNG
BERNARD M. GORDON
SHERMAN RIGBY

BY Joseph Weingarten
ATTORNEY

Nov. 22, 1960 F. M. YOUNG ET AL 2,961,611

FREQUENCY DISCRIMINATOR

Filed Jan. 17, 1957 2 Sheets-Sheet 2

*INVENTORS*

FRINK MANSFIELD YOUNG
BERNARD M. GORDON
SHERMAN RIGBY

BY Joseph Weingarten
*ATTORNEY*

United States Patent Office 2,961,611

Patented Nov. 22, 1960

2,961,611

FREQUENCY DISCRIMINATOR

Frink M. Young, Boston, Bernard M. Gordon, Newton, and Sherman Rigby, Boston, Mass., assignors to Epsco, Incorporated, Boston, Mass., a corporation of Massachusetts Filed Jan. 17, 1957, Ser. No. 634,634

9 Claims. (Cl. 328—141)

The present invention relates in general to frequency sensitive apparatus and more particularly to novel discriminator techniques whereby usable data may be derived from frequency shift input information with hitherto unattainable precision, economy and circuit flexibility.

Broadly speaking, a frequency discriminator is a device which provides an output, bearing a predetermined relationship to the magnitude and sense of the deviation of the frequency of an input signal from some preestablished frequency reference. The utility of such circuits is now so well established in the electronics art that specific examples are hardly necessary here, except for the observation that the nature of the application, and more specifically, such factors as precision, reliability and cost have had a marked effect on the design trends in this art. Needless to say, the largest single application for frequency discriminators is found in FM radio receivers. Here, through the utilization of resonant circuits tuned above and below the desired frequency reference, an output voltage of one polarity and increasing value is obtained for frequency variations above the reference, while an output voltage of opposite polarity is furnished as an output for decreasing signal frequencies. While eminently suited to radio systems, this basic discriminator design presents certain problems chief among which are non-linearity, poor sensitivity in the region of zero frequency deviation, ambiguous output fall-off for deviations beyond some value determined by circuit resonances, and perhaps most limiting, a dependence on critically tuned circuits for a frequency standard.

For the purpose of avoiding tuned circuits and the attendant requirements for critical preadjustment and drift compensation, discriminators have been developed in the reference comprises a time rather than a frequency standard. A discriminator within this classification is described in the copending application of Bernard M. Gordon, entitled Frequency Detecting Unit, Serial No. 584,802, filed May 14, 1956, and basically consists of an axis crossing detector, a precision delay circuit and a bistable circuit, such as a flip-flop, whose state is governed by signals applied directly from the axis crossing detector and by the same signals after emergence from the delay unit. In a discriminator of this type only one axis crossing per cycle is used, and the delay is preferably chosen as one-half the period of the desired discriminator center frequency. Consequently once during each input cycle, the flip-flop is turned to one condition by the occurrence of an axis crossing pulse, the latter after the appropriate delay also serving to return the flip-flop to its initial state. Assuming a fixed output voltage level for the flip-flop, the square wave thus obtained, averaged over one cycle, is directly proportional to the instantaneous frequency shift. For continuous indication, the output must be averaged, or integrated, over several cycles, the length of integration being chosen as consistent with desired accuracy.

In the discriminator described in the aforementioned copending application, the flip-flop output is not directly applied to the integrator; rather, the flip-flop square wave is used to actuate a switching circuit whose function is to pass a current of carefully controlled magnitude to the integrating device during each interval between set and reset pulses. Thus, the flop-flop serves solely as a switch timing device, and the need for precision circuitry is confined to the current source.

The present invention represents an extension of the principles of the copending application, and has as a primary object the provision of a discriminator utilizing a fixed time standard as the system reference which is capable of long term linear operation over a relatively broad frequency band substantially without adjustment and with exceptional freedom from error due to time variation of circuit parameters.

In one aspect of the present invention, an output representative of frequency deviation is derived by differentially combining two currents, one being of continuous, fixed value which effectively establishes the output reference level, while the other consists of current pulses all of equal predetermined magnitude whose repetition rate is equal to or proportional to the input signal frequency and whose time duration is equal to the difference between the period of the input signal and some fixed time standard, set for example by a quartz delay line. For the generation of this second current, the input signal is applied to an axis crossing detector which yields as an output one sharply defined electrical impulse for each full input cycle. These axis crossing pulses are in turn applied to the delay line, and a flip-flop is arranged to be set by delay line output pulses and reset by undelayed pulses, thereby furnishing a control signal whose time durtaion is the difference between the input and delay periods. Through the use of a fixed magnitude current supply and a switch circuit activated by the flip-flop signal output, the desired current pulses, which bear the frequency deviation information, are obtained.

In a novel manner, and for reasons which shall become apparent from the detailed analysis which follows, the period of the delay element is chosen as greater than one-half period of the mean frequency of operation of this discriminator. From the previous discussion, it therefore follows that each current pulse passed by the flip-flop controlled switch will be less than one-half period of the mean frequency set by the design parameters.

The differential combination of the steady and pulsed currents provides the system output. A low pass differential amplifier may be used effectively to average the pulsed current for comparison with the steady reference current, and when the latter, hereinafter referred to as the "subtraction current" is adjusted to cancel the contribution of the pulsed current when the input frequency equals the mean frequency of operation, zero output is obtained. Thereafter a bipolar output is available, one polarity when the average pulse current exceeds, and opposite polarity when the average falls below, the magnitude of the steady subtraction current. Resultantly, the magnitude of the system output is directly and linearly proportional to frequency deviation, while polarity is indicative of the sense of the deviation from the reference.

It is thus an object of this invention to provide a novel frequency sensitive circuit using a delay element as a precision standard for the determination of frequency deviation.

Another object of this invention is to utilize a delay element in a frequency discriminator in a novel manner whereby the system output is relatively insensitive to drift in the magnitude of the zero determining subtraction current, with the attendant advantage of reduction in the need for critical calibration adjustments.

Another object of this invention is to provide a frequency discriminator whose reference is a delay element wherein the mean frequency of operation may be readily adjusted over wide limits without adjustment or substitution of the delay element.

Another object of this invention is to provide a frequency discriminator wherein a delay element is combined with the current sources to furnish a bipolar output which accurately and reliably characterizes both the magnitude and sense of frequency deviation from a predetermined reference.

A further object of this invention is to provide a frequency discriminator wherein the current sources are selectively controlled by input signal amplitude and arranged to preclude ambiguous or erroneous outputs in the absence of sufficient input signal strength.

These and other objects of the present invention will become more apparent from the following detailed description when read in conjunction with the accompanying drawings, wherein like reference numerals designate like parts throughout the several views, and in which.

Figure 1:
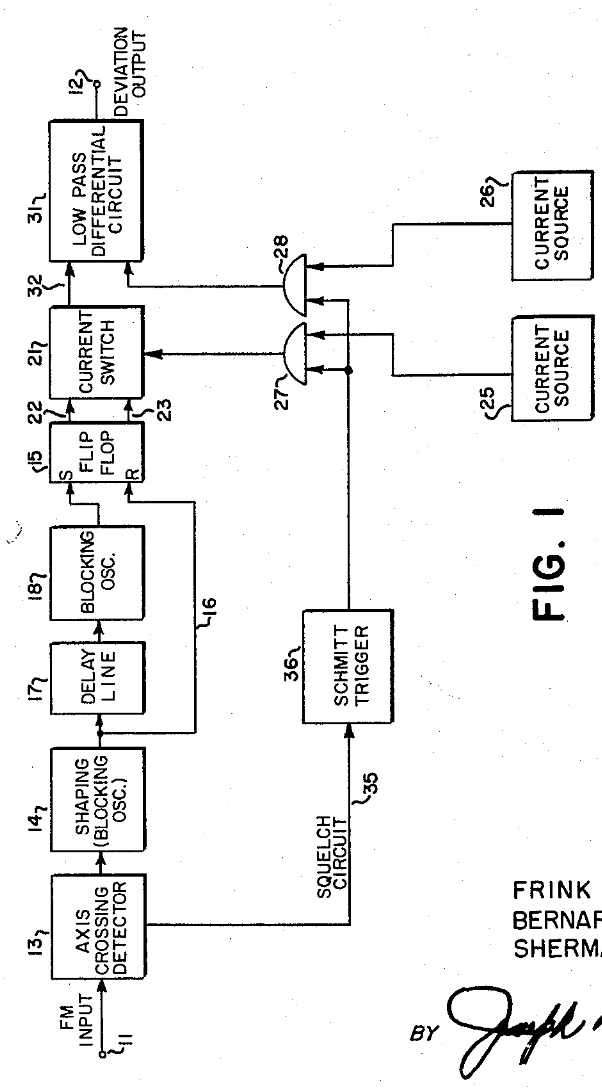
Fig. 1 is a logical block diagram illustrating the interconnection of key circuit elements comprising the novel frequency discriminator of the present invention.

With reference now to the drawing and more particularly to Fig. 1 thereof, the organization of a frequency discriminator embodying the novel concepts of this invention will first be discussed generally.

Broadly speaking, this circuit is adapted to accept at terminal 11 an input signal whose frequency may be fixed or variable, and to provide at output terminal 12 a continuous signal whose magnitude is accurately and linearly related to the extent of, and whose polarity is a function of the sense of, the deviation of the frequency of the input signal.

As illustrated, the input signal is first applied to an axis crossing detector 13 whose function is to deliver one output pulse for each full cycle of the input signal. Various known means are available for accomplishing this function; for example, the input signal may be repeatedly amplified and limited so that a square wave is obtained from a sine wave input. By differentiation of the square wave and rejection of negative pulses, a train of positive pulses representing the positive-going axis crossovers of the input signals is obtained. As an alternative, the input signal may be amplified and applied to a flip-flop sensitive to polarity reversals to provide a square wave for differentiation.

Axis crossover pulses of selected polarity are then applied to pulse shaping circuit 14 which may comprise one or more blocking oscillators in cascade. For reasons which will be noted later, the outputs of shaping circuit 14 are exceedingly narrow potential spikes whose leading edges correspond in time to the axis crossovers of the input signal.

The output of shaping circuit 14 is used to actuate both the set and reset inputs of flip-flop 15; the reset input being activated directly over line 16 while the set input is activated through a circuit consisting of delay line 17 and blocking oscillator 18.

The delay line 17 for reasons of reliability, stability, and precision is preferably made of quartz. However, it will be understood that any of the other conventional delay arrangements as, for example, a delay flip-flop or a lumped constant delay line are usable, subject however to the limitations normally encountered with devices and circuits of those types.

It was mentioned earlier that the potential spikes provided as the output of pulse shaping circuit 14 were on extremely short time duration. It has been observed that as a result it is possible to drive a quartz delay line directly with video signals of this waveform and thus avoid the necessity for first modulating a high frequency carrier. A considerable saving of modulating and demodulating equipment is thus achieved.

Blocking oscillator 18 serves to sharpen the signal output of delay line 17 and also to remove any spurious responses resulting from multiple reflection in the delay line. Thus, equally sharp pulses are applied to the set and reset inputs of flip-flop 15.

Examining the particular set and reset activating circuits of the flip-flop 15, it will be seen that a reset pulse will be applied once during each cycle of the input signal while a set pulse will be applied at a corresponding rate, but that each set pulse will be delayed for a period determined by the characteristics of delay line 17. Effectively then, the flip-flop 15 will produce an output signal, wherein the duration of each pulse will be equal to the difference between the period of the input signal and the delay period of delay line 17.

Current switch 21 comprises essentially a differential amplifier controlled over lines 22 and 23 by the bipolar outputs of flip-flop 15, and is arranged to be closed (allowing current flow) during the period between the application of set and reset pulses to flip-flop 15.

Two precision current sources 25 and 26 are provided and are coupled through AND gates 27 and 28, respectively to current switch 21 and to an input of low pass differential circuit 31. The output of current switch 21 provides over line 32 the second input to differential circuit 31.

Returning to the system input a squelch circuit is provided by deriving a signal from the amplifiers of axis crossing detector 13 for application over line 35 to a Schmitt trigger 36. The output of Schmitt trigger 36 serves as the second input to each of the AND gates 27 and 28.

Schmitt trigger 36 is adjusted so that a permissive signal is applied to gates 27 and 28 when the input on line 35 exceeds some preestablished level. Should the input signal thereafter fall below this acceptable value, the Schmitt trigger is activated and functions to close gates 27 and 28, which as will become apparent, thus preclude an output at terminal 12. In this manner outputs, which might otherwise be either ambiguous or erroneous due to inadequate signal level at terminal 11, are prevented.

Assuming now that the signal level at input terminal 11 is sufficient to furnish a permissive signal through Schmitt trigger 36 to AND gates 27 and 28, a steady subtraction current from source 26 will be applied to differential circuit 31. The other input to differential circuit 31 is supplied in the form of current pulses derived by switching the current output of source 25 through current switch 21 under the control of flip-flop 15. Considering differential circuit 31 as a low pass device (which will be described more fully below), then the output signal furnished at terminal 12 will represent the difference between the current supplied from source 26 and the average of the pulsed current flowing from source 25.

If the period of delay line 17 is chosen to be slightly less than the period of the mean frequency of operation of the discriminator shown in Fig. 1, some small average current will flow over line 32 when the frequency of the input at terminal 11 equals the desired mean frequency, or expressed otherwise, when the frequency deviation is exactly zero. In order, therefore, to provide zero output at terminal 12 it is necessary to adjust the subtraction current source 26 to furnish differential circuit 31 with an equal average current. The two currents are then cancelled in the differential circuit and a zero magnitude output signal appears at terminal 12.

Figure 2:
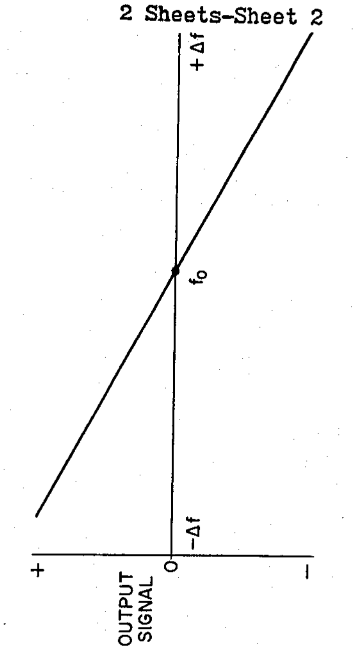
Fig. 2 is a graphical representation of the linear bipolar output, about the selected mean frequency of operation, achieved by the discriminator illustrated in Fig. 1.

This condition is graphically illustrated in Fig. 2 which is a plot of output signal amplitude at terminal 12 as a function of frequency deviation $\Delta_f$ about the mean frequency operation $f_0$.

As the input frequency at terminal 11 increases, the time difference between set and reset pulses applied to flip-flop 15 diminishes, and as a consequence, the average current applied to differential circuit over line 32 likewise is diminished. Under such conditions the invariant current from source 26 is now larger than the average pulsed current and a negative output signal, whose amplitude increases linearly with increasing input frequency, is obtained at terminal 12.

Conversely, as the input signal frequency decreases below the mean frequency of operation $f_0$, the average of the pulsed current applied to differential circuit 31 over line 32 is increased beyond that furnished by the subtraction current source 26; consequently an output of positive polarity is obtained at terminal 12.

Figure 3:
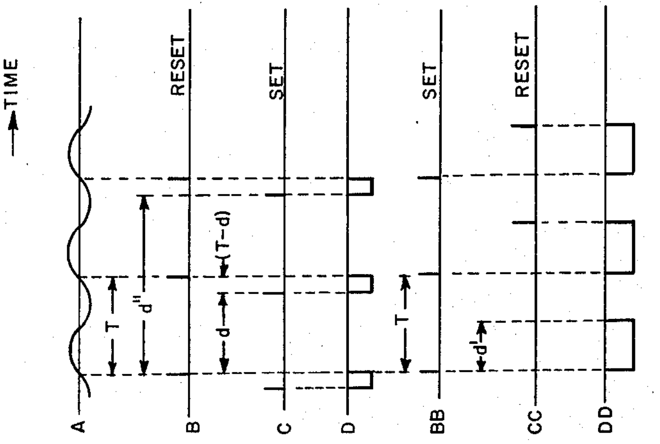
Fig. 3 is a graphical representation of waveforms which will be found convenient in discussing both performance and advantages of the system disclosed in Fig. 1.

The waveforms of Fig. 3 have been provided as a convenient means for illustrating on a common time axis, certain operational aspects, and for demonstrating several of the advantageous features of the discriminator circuit disclosed in Fig. 1.

Let it be considered that the system input at terminal 11 is a sinusoidal voltage as shown in Fig. 3A having a period T and a frequency $f$, where, $f=1/T$.

From the foregoing discussion, the output pulses of shaping circuit 14 mark the positive-going crossovers, and these exceedingly sharp potential spikes are shown in Fig. 3B. These pulses are applied as reset signals to flip-flop 15, and also as an input to delay line 17 whose delay period $d$ is less than the preestablished mean period of operation, yet greater than one-half this period.

Assuming that the input signal shown in Fig. 3A is relatively close to the mean period, then the delayed pulses shown in Fig. 3C accurately represent the output of delay line 17 where pulses of Fig. 3B comprise the input thereto. These delayed pulses are in turn applied as the set input to flip-flop 15.

Fig. 3D illustrates a train of rectangular waveform pulses whose duration is equal to $(T-d)$, corresponding to the time interval between set and reset pulses of Fig. 3C and Fig. 3B, respectively.

The pulse train of Fig. 3D may first be thought of as the voltage output of flip-flop 15, but it is also representative of the intervals during which current switch 21 is closed and passing current. Thus, from another standpoint, treating the ordinate of Fig. 3D as current, this waveform also represents the current flow in Fig. 1 from source 25 over line 32 to differential circuit 31. The peak magnitude of each of these current pulses is precisely equal to the standard value set in current source 25, and the average of these current pulses is a measure of the deviation of the frequency $f$ of the input from the mean frequency.

For the comparative analysis which follows, Fig. 3BB again shows the positive axis crossovers as in Fig. 3B for a sine wave input as in Fig. 3A. Fig. 3CC however shows these pulses delayed in time by an interval $d'$ of approximately one-half the preestablished mean period of operation. With reference to the aforementioned copending application, and using the undelayed pulses of Fig. 3BB as flip-flop set pulses and the delayed pulses of Fig. 3CC for reset, the pulsed current waveform of Fig. 3DD is achieved, each current pulse having a duration equal to $(T-d')$.

Returning now to the waveforms Figs. 3A–3D inclusive which are relevant to the circuit of Fig. 1, the following relationships may be developed. Thus the average current $i_a$, taking as I the amplitude of current pulses from switch 21, is $$i_a=\frac{I(T-d)}{T}$$
$$=I(1-d/T)$$

Since, $T=1/f$ $$i_a=I(1-df)$$

and the sensitivity, measured as the change in $i_a$ generated by a small change in $f$, may be expressed:

$$\frac{di_a}{df}=-Id$$

If the input signal is at mean frequency, namely, $T=T_0$, and $f=f_0$, the average current under these circumstances will be $$i_a=I(1-df_0)$$

and in order to have zero output at terminal 12, the steady subtraction current $i_s$ must be fixed at this value, or $$i_s=I(1-df_0)$$

Taking $e$ as a fractional change in $i_s$, that is $ei_s=\Delta i_s$, and computing now the equivalent frequency deviation $\Delta f_e$ which is represented by this fractional change in $i_s$, it is seen that $$ei_s=\Delta i_s=eI(1-df_0)$$

and substituting for $\Delta i_s$ from the relation given for sensitivity, $$Id\Delta f_e=eI(1-df_0)$$

from which $$\Delta f_e=e\frac{1-df_0}{d}$$

and, defining $X_1$ as $$\frac{\Delta f_e}{f_0}$$

$$X_1=\frac{\Delta f_e}{f_0}=e\frac{T_0-d}{d}$$

This last equation thus expresses the relative frequency change for a slight variation, for whatever cause, in the steady subtraction current $i_s$ from source 26 in Fig. 1.

Deriving the equivalent relationships for the waveforms given in Figs. 3BB to 3DD inclusive, the average current, $i_a'$ $$i_a'=\frac{Id'}{T}$$

and the sensitivity $$\frac{di_a'}{df}=Id'$$

When the input signal is at mean frequency, the subtraction current $i_s'$ needed to reduce the output to zero is $$i_s'=Id'f_0$$

Again computing the equivalent frequency deviation $\Delta f_e$ for a fractional change $e$ in $i_s'$, $$\Delta i_s'=ei_s'$$
$$Id'\Delta f_e=ei_s'$$
$$\Delta f_e=e\frac{Id'f_0}{Id'}=ef_0$$

and dividing through by $f_0$, and defining $$X_2=\frac{\Delta f_e}{f_0}$$

$$X_2=\frac{\Delta f_e}{f_0}=e$$

which expresses the relative frequency change indicated when the subtraction current varies slightly in the example represented by the waveforms of Figs. 3BB–3DD.

Computing now the fraction, $X_1/X_2$ $$\frac{X_1}{X_2}=\frac{e\frac{T_0-d}{d}}{e}=\frac{T_0-d}{d}$$

which clearly is less than one, if $d$ is greater than $T_0/2$. In other words, by fixing the delay period $d$ as greater than $T_0/2$, as shown in Fig. 3B, the system shown in Fig. 1 is relatively insensitive to variations in subtraction current; hence minor drifts due to environmental change and component will be of least possible effect on overall accuracy and reliability. This is a particularly advantageous feature of the present invention since the only system adjustment, as will be shown, is connected with the subtraction current supply, and consequently minor errors in calibration will be substantially without effect.

By comparable analysis, it may also be demonstrated that the deviation output is also less sensitive to fluctuations for whatever cause, in the pulsed current whose waveform is shown in Fig. 3D, than for equivalent variations in the pulsed current shown in Fig. 3DD. Moreover, it may be shown that similar advantages will accrue if the delay introduced by delay line 17 is slightly less than a multiple of the mean period $T_0$. This is graphically shown in Fig. 3B where the delay period is designated as $d''$, and is substantially equal to twice the period of the incoming wave shown in Fig. 3A.

Figure 4:
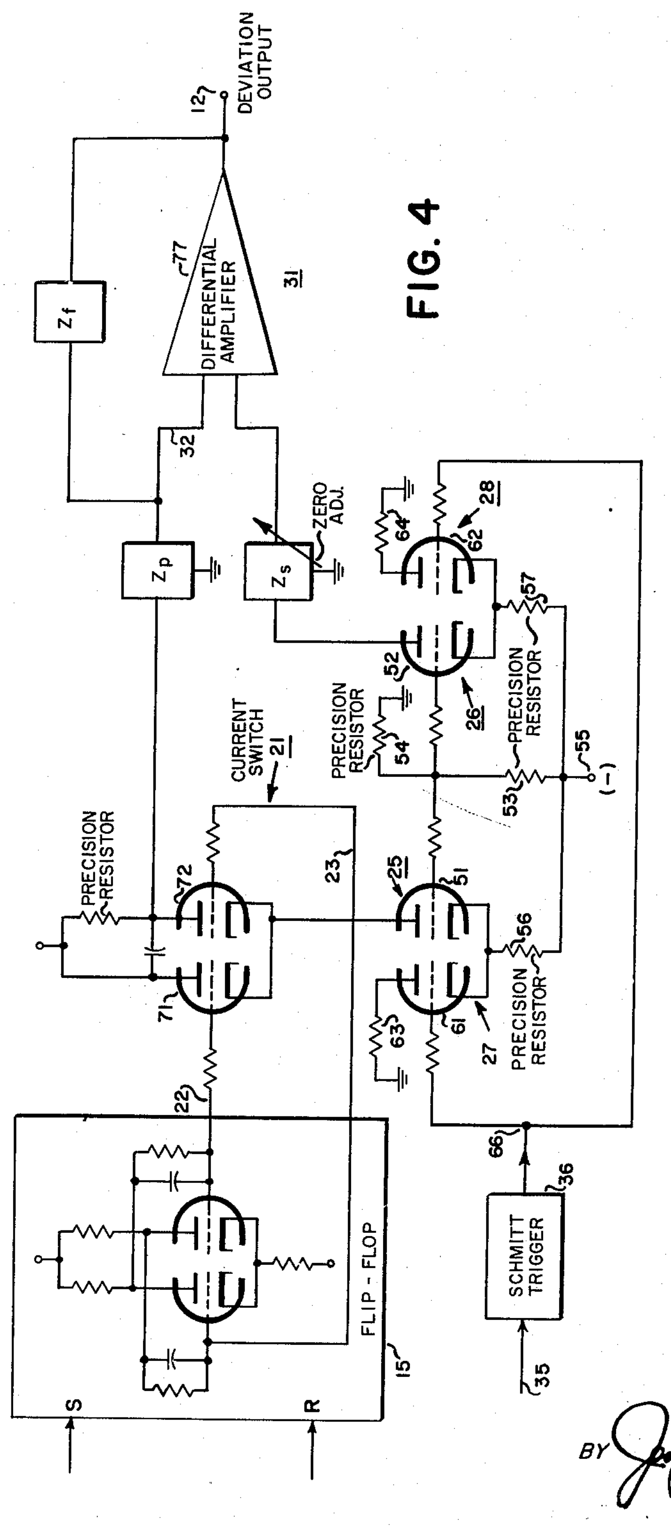
Fig. 4 is a circuit diagram, partly in schematic and partly in block form, illustrating details of certain of the circuit elements incorporated in the system of Fig. 1.

Fig. 4 discloses several of the circuits in Fig. 1 in greater detail. In particular, current sources 25 and 26 are obtained through triodes 51 and 52, respectively, whose grids are biased from the junction of a pair of precision resistors 53 and 54 serially connected between a stable negative voltage source applied at terminal 55 and ground. The cathodes of triodes 51 and 52 are returned to negative source 55 through precision resistors 56 and 57, respectively.

Gates 27 and 28 are also formed of a pair of triodes 61 and 62, respectively, whose cathodes are connected in parallel with those of the respective triodes 51 and 52, and whose anodes are grounded through resistors 63 and 64.

Under conditions of normal input signal level to the frequency discriminator, Schmitt trigger 36 provides an output signal at terminal 66 which is sufficiently negative to cut off tubes 61 and 62. However, should the Schmitt circuit be triggered as a result of the input level falling below the pre-established minimum, the potential at terminal 66 will rise sufficiently so that tubes 61 and 62 will become conductive. This in turn will sufficiently raise the level of the cathodes of tubes 51 and 52 to cut off both current sources 25 and 26.

Assuming normal operation, the output of current source 25 from the anode of tube 51 is applied to the parallel connected cathode of triodes 71 and 72 which comprise current switch 21. As illustrated, the grids of tubes 71 and 72 are driven by the opposite polarity outputs of flip-flop 15 which because of its conventional nature has only been partly shown in Fig. 4. Operation, however, is such that when flip-flop 15 is conditioned by a set pulse the grids of tubes 71 and 72 are respectively negative and positive, or non-conducting and conducting. When flip-flop 15 has been conditioned by a reset pulse, the opposite condition is true in the triodes which comprise current switch 21.

Evidently therefore when tube 72 is conductive, current flows through tubes 51 and 72 in series and that portion of the current which flows through impedance $Z_p$ develops a potential which is applied as an input over line 32 to differential amplifier 77.

The steady subtraction current which flows through tube 52 passes through impedance $Z_s$ and furnishes output potential which is applied as the second input to differential amplifier 77. At this point it should be observed that since impedances $Z_p$ and $Z_s$ function to provide output potentials proportional to the precision currents flowing therethrough, that these must likewise be precision components, as for example, precision wire wound resistors.

At this juncture, certain aspects of the precision current sources are in order. Taking current source 26 as representative, it is seen that precision resistors 53 and 54 exactly determine the potential at the grid of triode 52. The current through this tube is equal to the voltage across resistor 57 divided by its resistance. However, the latter voltage is in turn equal to the drop across resistor 53, less the bias voltage between grid and cathode of triode 52. By making the drop across resistor 53 quite large compared to the grid to cathode bias just mentioned, then a given percentage change in the bias for any cause will produce a much smaller percentage change in the tube current. For this reason the negative potential applied at terminal 55 is preferably of the order of −600 volts.

Differential amplifier 77 provides an output at terminal 12 representative of the difference between the two applied signals. Inasmuch as one of the inputs to differential amplifier 77 is a steady potential derived from current source 26 while the other is a pulsed signal from current switch 21, a low pass feedback loop in the form of a filter impedance $Z_f$ is used to connect the differential output to input line 32. By making the time constant of $Z_f$ sufficiently large, a smooth average output signal representative of the frequency deviation is obtained at output terminal 12.

As has been previously described, when the input signal to the system is precisely equal to the desired mean frequency of operation, zero output voltage is present at terminal 12. One of the principal advantages of the present invention is that for all the circuits disclosed, but one adjustment is necessary to achieve this desired operating condition. Thus, impedance $Z_s$ which provides an output potential proportional to the magnitude of the subtraction current may be made adjustable, as for example, by a "Trimpot." Having once achieved this condition of balance at mean frequency input, no further adjustment is required and as analytically shown earlier in connection with Fig. 3, the nature of the circuits is such that component aging, including tubes, has exceedingly little effect upon system output.

The manner in which the principles of the present invention are embodied in specific apparatus will of course be a function of the application thereof. For example, as described herein, a sinusoidal input may be applied at terminal 11. Should the input signal, however, consist of sharply defined pulses, axis crossing detector and pulse shaping circuits 14 would become unnecessary. Other changes may be made to suit the operational requirements of a particular system.

It is thus apparent that numerous modifications and extensions of the principle herein disclosed will become evident to those skilled in the art. Accordingly, it is preferred that this invention be limited solely by the spirit and scope of the appended claims.

What is claimed is:

1. Frequency discriminator apparatus comprising, means for generating a sequence of impulses related in frequency to an input signal, means for establishing a reference time interval slightly less than the mean operating period of said frequency discriminator, means responsive to said impulses for generating current pulses having a duration equal to the difference between successive impulses and said reference time interval, and low pass means for differentially combining said current pulses and a fixed subtraction current, said subtraction current being effective to provide bipolar outputs from said low pass means in response to deviations of said input signal about said mean operating period.

2. A precision frequency discriminator comprising, an axis crossing detector responsive to an input signal to provide a sequence of relatively sharp potential impulses spaced in time correspondence with the period of said input signal, a bistable circuit having set and reset inputs and arranged to provide an output control signal of duration equal to the time difference between the successive application of pulses to said set and reset inputs, a delay line furnishing a time delay between input and output terminals thereof greater than an odd number of half periods at the mean frequency of said input signal, means for simultaneously applying said sharp potential impulses from the output of said axis crossing detector to said input terminal of said delay line and said reset input of said bistable circuit, means coupling said output terminal of said delay line to said set input of said bistable circuit, a current source, means switching said current source in response to the output of said bistable circuit, and low pass means for furnishing a potential output whose amplitude is related to the energy content of current from said source.

3. A precision frequency discriminator comprising, an axis crossing detector responsive to an input signal to provide a sequence of relatively sharp potential impulses spaced in time correspondence with the period of said input signal, a bistable circuit having set and reset inputs and arranged to provide an output control signal of duration equal to the time difference between the successive application of pulses to said set and reset inputs, a delay line furnishing a time delay between input and output terminals thereof greater than one-half but less than the full mean period of said input signal, means for simultaneously applying said sharp potential impulses from the output of said axis crossing detector to said input terminal of said delay line and said reset input of said bistable circuit, means coupling said output terminal of said delay line to said set input of said bistable circuit, said output control signal of said flip-flop thereby having a duration equal to the difference between said period of said input signal and the delay interval of said delay line and less than one-half the mean period of said input signal, first and second precision current sources, a current switch responsive to said flip-flop output for limiting current flow from said first current source to intervals equal in duration to said control signal, and a low pass differential amplifier for combining the current output of said current switch and the steady current output of said second current source.

4. A precision frequency discriminator comprising, an axis crossing detector responsive to an input signal to provide a sequence of relatively sharp potential impulses spaced in time correspondence with the period of said input signal, a bistable circuit having set and reset inputs and arranged to provide an output control signal of duration equal to the time difference between the successive application of pulses to said set and reset inputs, a delay line furnishing a time delay between input and output terminals thereof greater than one-half but less than the full mean period of said input signal, means for simultaneously applying said sharp potential impulses from the output of said axis crossing detector to said input terminal of said delay line and said reset input of said bistable circuit, means coupling said output terminal of said delay line to said set input of said bistable circuit, said output control signal of said flip-flop thereby having a duration equal to the difference between said period of said input signal and the delay interval of said delay line and less than one-half the mean period of said input signal, first and second precision current sources, a current switch responsive to said flip-flop output for limiting current flow from said first current source to intervals equal in duration to said control signal, a differential circuit, first and second input impedances, means for applying the current output of said current switch and the current output of said second source to said first and second input impedances respectively, said differential circuit being arranged to yield an output proportional to the difference between the potentials developed across said first and second impedances, a low pass filter providing a feedback connection from said differential circuit output to said first input impedance, and gating means responsive to said input signal and arranged to preclude current flow from said first and second sources when said input signal falls below a preestablished value.

5. Frequency discriminator apparatus as in claim 4 wherein said first and second current sources comprise a pair of triode electron tubes each having precision resistors serially arranged in the cathode circuits thereof, a fixed voltage source energizing said precision resistors, and a precision voltage divider energized from said voltage source for setting the grid potentials of said triodes.

6. Frequency discriminator apparatus as in claim 5 wherein said gating means includes first and second electron tubes each having a cathode circuit in common with a respective one of said current source triodes, and trigger circuit means for selectively rendering said first and second electron tubes conductive and non-conductive in response to amplitude variations of said input signal.

7. Frequency discriminator apparatus as in claim 4 wherein said second current source furnishes a fixed direct current substantially equal to the average current output of said current switch when the period of said input signal equals said mean period, whereby said average current increases and diminishes with reference to said fixed current as the period of said input signal correspondingly increases and decreases.

8. Frequency discriminator apparatus as in claim 7 wherein said first impedance is adjustable to provide means for setting the output of said differential amplifier to zero for the mean period of said input signal.

9. A precision frequency discriminator comprising, means responsive to an input signal to provide a sequence of relatively sharp potential impulses spaced in time correspondence with the period of said input signal, a bistable circuit having set and reset inputs and arranged to provide an output control signal of duration equal to the time difference between the successive application of pulses to said set and reset inputs, a delay line furnishing a time delay between input and output terminals thereof greater than an odd number of half periods at the mean frequency of said input signal, means for simultaneously applying said sharp potential impulses to said input terminal of said delay line and said reset input of said bistable circuit, means coupling said output terminal of said delay line to said set input of said bistable circuit, an energy source, means switching said energy source in response to the output of said bistable circuit, and low pass means for furnishing a potential output whose amplitude is related to the energy derived from said source.

References Cited in the file of this patent

UNITED STATES PATENTS

| | | |
|---|---|---|
| 2,469,066 | Day | May 3, 1949 |
| 2,668,910 | Starr | Feb. 9, 1954 |
| 2,724,780 | Harris | Nov. 22, 1955 |
| 2,725,470 | Houghton | Nov. 29, 1955 |
| 2,738,463 | Metzger | Mar. 13, 1956 |
| 2,762,949 | Huffman | Sept. 11, 1956 |
| 2,776,424 | Lair et al. | Jan. 1, 1957 |
| 2,803,818 | Byrne | Aug. 20, 1957 |
| 2,847,566 | Metzger | Aug. 12, 1958 |